Oct. 17, 1961 A. D. RUSSELL 3,005,043

ELECTRONIC TESTING SYSTEM AND APPARATUS THEREFOR

Filed Jan. 12, 1953 3 Sheets-Sheet 1

Inventor
Allan D. Russell
by Roberts, Cushman & Grover
Att'ys.

ELECTRONIC TESTING SYSTEM AND APPARATUS THEREFOR

Filed Jan. 12, 1953 3 Sheets-Sheet 2

Inventor
Allan D. Russell
by Roberts, Cushman & Grover
att'ys.

Oct. 17, 1961 A. D. RUSSELL 3,005,043

ELECTRONIC TESTING SYSTEM AND APPARATUS THEREFOR

Filed Jan. 12, 1953 3 Sheets-Sheet 3

INVENTOR.
ALLAN D. RUSSELL
BY
Porter, Chittick & Russell
ATTORNEYS 3,005,043

ELECTRONIC TESTING SYSTEM AND APPARATUS THEREFOR

Allan D. Russell, Medford, Mass., assignor, by mesne assignments, to Kingston Electronic Corporation, Cambridge, Mass.

Filed Jan. 12, 1953, Ser. No. 330,880
6 Claims. (Cl. 178—5.8)

This invention relates to electronic testing apparatus or waveform analyzers for locating defective tubes or circuits in television receiver installations by tracing the various sound, picture and sweep signals through the receiver and examining the signals aurally or visually for distortion and like characteristics of faulty receiver operation. The apparatus may be used also for installing and checking television antennas.

The several signals commonly appearing in a television receiver are video or picture signals at radio frequency, at intermediate frequency, and at natural frequency; audio or sound signals at radio frequency, at intermediate or intercarrier sound frequency, and at audio frequency; horizontal synchronizing and sweep signals; and vertical synchronizing and sweep signals. For detecting and presenting these signals the usual television receiver employs at least seven principal channels. These are commonly identified as a radio-frequency channel, a video intermediate-frequency channel, a video amplifier channel, an audio intermediate-frequency channel, an audio amplifier channel, and vertical sweep and horizontal sweep channels.

One obvious way of tracing signals would be to transfer the signals at the various channels or stages of the set under test to the corresponding succeeding channel or stage of a duplicate receiver known to be operating properly. However, use of a duplicate receiver would be impractical and time-consuming. On the other hand, test equipment now available is incapable of detecting and indicating the several signals of a television set.

An object of the present invention is to provide a simple, compact test instrument capable of tracing these signals of several types and indicating them visually or aurally. A more specific object is to reduce the number of channels from the seven or more present in a standard television receiver to three or four in number and to employ the reduced number of channels so as to reproduce the several functions of a larger number of channels.

A further object is to provide a novel device for tuning certain of the channels according to the frequency of the signal being traced whereby high sensitivity can be maintained in the test apparatus.

In one aspect the apparatus comprises an input terminal to which the signal to be tested is applied; a radio frequency channel which includes a radio-frequency amplifier and detector, means for attenuating radio and intermediate-frequency signals, and means for tuning the radio-frequency channel to said signals; a video signal indicator such as a cathode ray oscilloscope or signal-amplitude-measuring meter; an audio intermediate-frequency channel including an intermediate-frequency amplifier and audio detector; an audio output channel; a speaker; and a plurality of ganged switch means each of which has a plurality of positions corresponding to positions of other of the ganged switch means, the ganged switch means including a first switch following the aforesaid signal-input terminal, a second switch between the aforesaid detector and video indicator, and a third switch between the aforesaid audio detector and the audio output channel; the switches being connected to provide in one position a path for picture signals at radio frequency and intermediate frequency, said path proceeding via the radio-frequency channel to the indicator; to provide in another position a high-gain sound intermediate-frequency path via the radio-frequency channel and the audio output channel to the speaker; to provide in a further position a low-gain sound intermediate-frequency path via the audio intermediate frequency channel and the audio output channel to the speaker; and to provide in still another position a sound radio frequency path via the radio frequency channel, the audio intermediate frequency channel, and the audio output channel to the speaker; whereby the channels may be selectively connected in the correct combinations to provide a plurality of paths for detecting and amplifying television signals of different characteristics. The aforesaid apparatus may also include an additional position for the ganged switch means which provides an audio frequency-path via the audio output channel to the speaker. A further position may be provided which will afford a horizontal sweep frequency-path from the input terminal to the audio output channel and speaker.

One of the novel aspects of the invention resides in an oscillator associated with the sweep-frequency path which generates a signal differing from the sweep frequency by an audibly-distinguishable frequency, the oscillator being connected so that its signal beats against the sweep frequency so as to apply the audibly-distinguishable frequency to the speaker. If desired, the ganged switch means may be provided with an additional position which affords a radio frequency- and a video intermediate frequency path from the input terminal via the video channel, audio intermediate frequency channel, and the audio output channel to the speaker; thereby affording aural testing of said frequencies.

In a more specific aspect the aforesaid attenuating and tuning means for the video channel comprise a plurality of attenuators and tuning elements and additional switch means associated with said video channel and ganged to the aforesaid switches and having corresponding positions in which said additional switch means selectively connects one of the attenuators and one of the tuning elements in radio and intermediate frequency-paths, respectively. Preferably, the tuning elements include one or more tuning networks each embodying an inductance and capacitance linked by a rotatable control which tunes the inductance in unison with the capacitance thereby maintaining high selectivity in the radio-frequency amplifier.

For the purpose of illustration, a typical embodiment of the invention is shown in the accompanying drawings in which.

Figure 1:
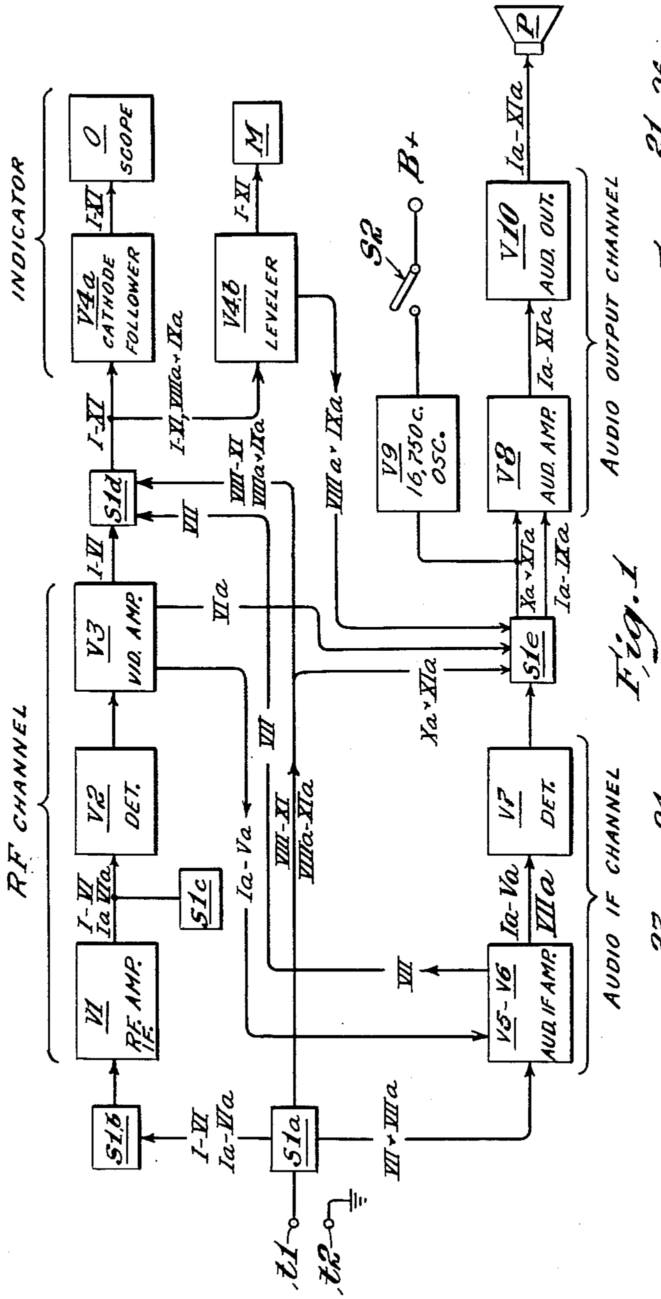
FIG. 1 is a block diagram of the testing apparatus.

In FIG. 1 is shown a block diagram of the testing apparatus which comprises a radio-frequency (RF) channel, and indicator, an audio intermediate-frequency (IF) channel, an audio output channel, and a speaker (P). The RF channel includes a radio-frequency amplifier V1, a detector V2, and a video amplifier V3. The indicator includes a cathode ray oscilloscope O and a microammeter M. The audio IF channel includes audio IF amplifiers V5 and V6, and a detector V7. The audio output channel includes an audio amplifier V8 and an audio output or power tube V10. Five ganged switches S1*a*—S1*e* provide eleven paths I to XI, respectively, through various frequency channels to indicators O and M. These five switches also provide eleven other paths I*a* to XI*a*, respectively, through various frequency channels to a speaker P. Television signals are fed to a pair of input terminals *t1* and *t2* by a pickup device D such as a pointed probe or other like pickups well known in the art. A satisfactory design for a pickup device D adapted particularly for testing tubes of a television receiver while they remain in the chassis and with the receiver in operation, is disclosed in detail in my copending application filed February 14, 1952 and bearing Serial No. 271,499. The paths followed by the various television signals through the channels are indicated by arrows identified by Roman numerals according to the schedule below.

TELEVISION SIGNAL PATHS

*Paths I–XI to oscilloscope and meter*

I—Antenna and radio frequency picture and sound signals, 1st station
II—Antenna and radio frequency picture and sound signals, 2nd station
III—Intermediate frequency picture signals, low amplitude
IV—Intermediate frequency picture signals, medium amplitude
V—Intermediate frequency picture signals, high amplitude
VI—Intermediate frequency sound signals
VII—Intercarrier sound signals
VIII—Video frequency sound and picture signals, low amplitude vertical synchronization pulse and vertical oscillator
IX—Audio frequency sound and picture signals, vertical sweep and synchronization pulse, high amplitude
X—Horizontal oscillator signals (1 kc. beat)
XI—Horizontal sweep signals (1 kc. beat)

*Paths Ia–XIa to speaker*

I*a*—Antenna and radio frequency sound signals, 1st station
II*a*—Antenna and radio frequency sound signals, 2nd station
III*a*—Intermediate frequency sound signals, low amplitude
IV*a*—Intermediate frequency sound signals, medium amplitude
V*a*—Intermediate frequency sound signals, high amplitude
VI*a*—Intermediate frequency sound signals, variable amplitude
VII*a*—Intermediate frequency intercarrier sound
VIII*a*—Audio frequency sound, sweep and sync. signals, low amplitude
IX*a*—Audio frequency sound, sweep and sync signals, high amplitude
X*a*—Horizontal oscillator signals (1 kc. beat) and vertical
XI*a*—Horizontal sweep signals (1 kc. beat) and vertical The above-listed signal paths will be discussed at greater length hereinafter. Notwithstanding their variety and number, the test equipment affording these paths is quite simple and compact.

Figure 2:
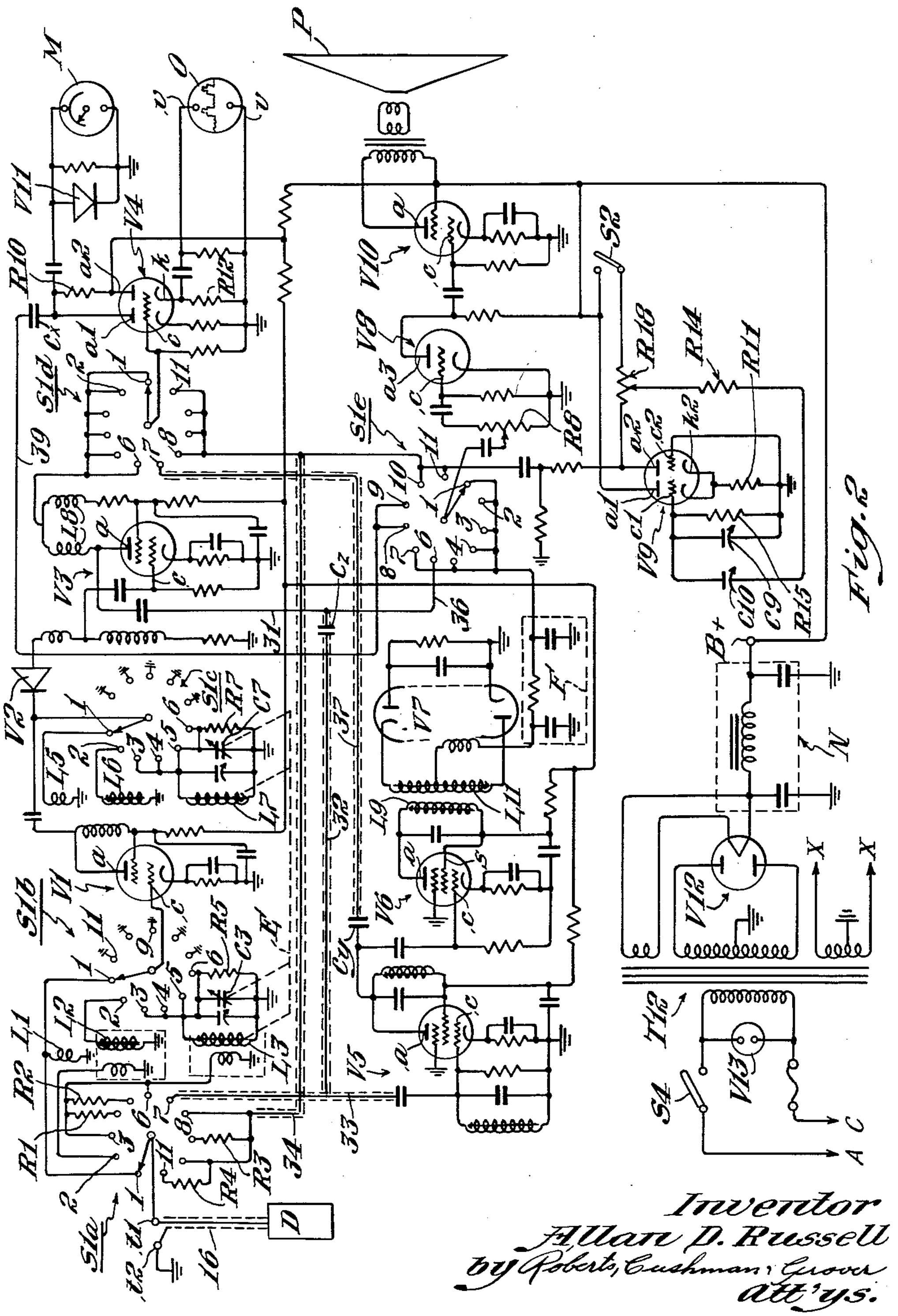
FIG. 2 is a schematic diagram.
Figure 5:
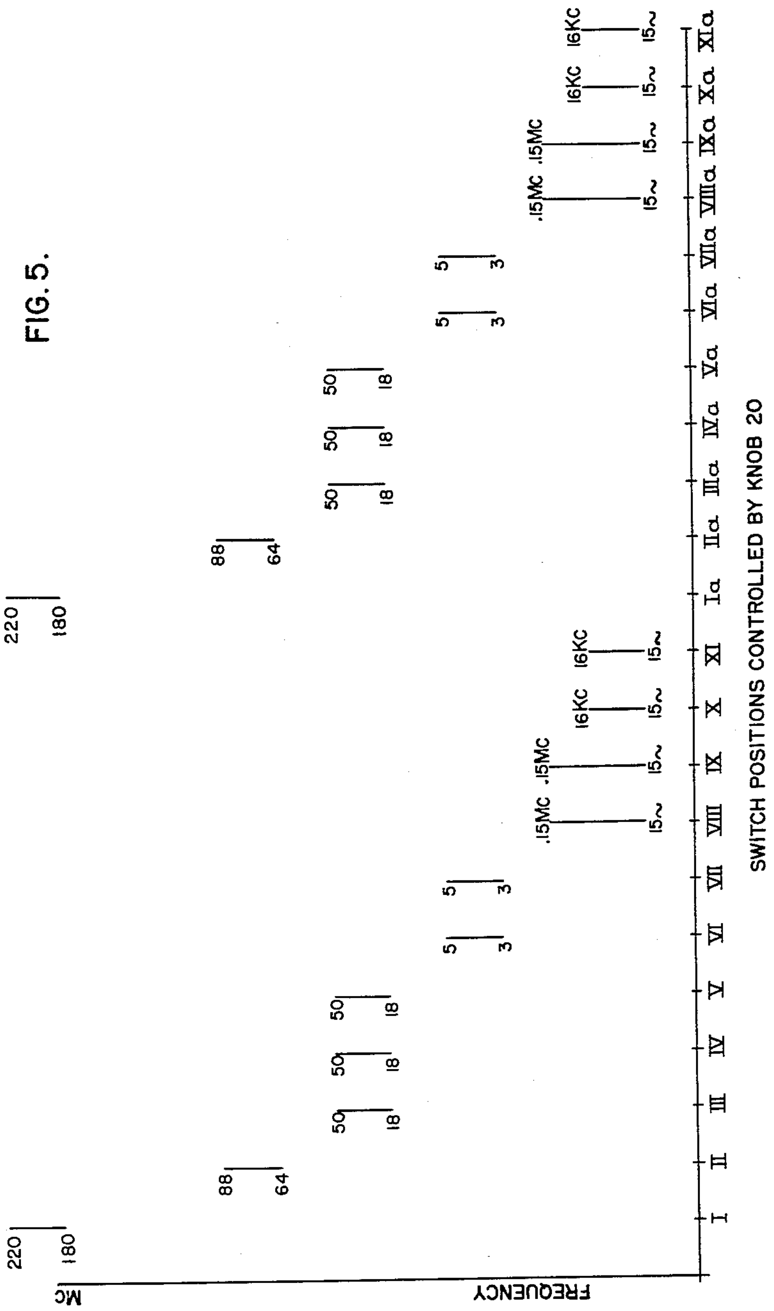
FIG. 5 is a graphical presentation illustrative of the various frequency channels or signal paths for which the apparatus herein is set up, at the respective contact or knob positions of the manually-adjustable part or parts.

As shown in FIG. 2, the test apparatus receives its power from a conventional power supply comprising power terminals A and C, an On-Off switch S4, pilot lamp V13, and a power transformer T12. The power transformer delivers heater current at terminals X—X, and drives a full-wave rectifier V12 which delivers plate voltage at terminal B+ through a filter network N.

Referring to the signal-input terminals *t1* and *t2*, the pickup device or probe D is connected thereto by means of a suitable length of coaxial shielded cable 16 whose conductor is connected to terminal *t1* and whose shield is connected to the grounded terminal *t2*. Terminal *t1* is connected to the wiper of the first switch S1*a* of five eleven-position, ganged switches S1*a* to S1*e*. For the eleven positions of the wiper there are the respective contacts 1 to 11, each contact being connected to one of the several stages of the tester. These contacts are at the beginning of the twenty-two frequency channels or designated paths I to XI and I*a* to XI*a*, respectively. In path I, intended to carry RF signals at a particular frequency, contact 1 is connected with a tuning coil L1 of the appropriate resonant frequency. Path II being intended to carry RF signals at a different frequency, contact 2 inductively connected with a tuning coil L2 of a different resonant frequency. Contacts 3 to 6 being intended to carry picture signals at intermediate frequencies (paths III–VI and III*a* to VI*a*) and at different amplitudes are connected either directly or through attenuating resistors R1 and R2 to a tuning network including resistance R5, a tuning coil L3, and a tuning condenser C3.

Paths I to VI lead respectively to contacts 1 to 6 of the second ganged switch S1*b*. The wiper of switch S1*b* is connected to the control grid *c* of an RF and IF amplifier V1.

The amplified signals appearing at the anode *a* of the RF amplifier V1 are capacitatively coupled to a germanium diode rectifier V2. Associated with the detector V2 is a third gang switch S1*c*. This third gang switch S1*c* associates with the detector one of the following tuning or attenuating circuits.

With contact 1 of switch S1*c* is associated a tuning coil L5 of the appropriate frequency for RF signals of path I or I*a*. Associated with contact 2 is a tuning coil L6 of appropriate characteristic for RF signals of a different frequency intended to travel on path II or II*a*. With contacts 3 to 6 are associated a tuning network comprising a resistance R7, a tuning coil L7, and tuning condenser C7.

Figures 3, 4:
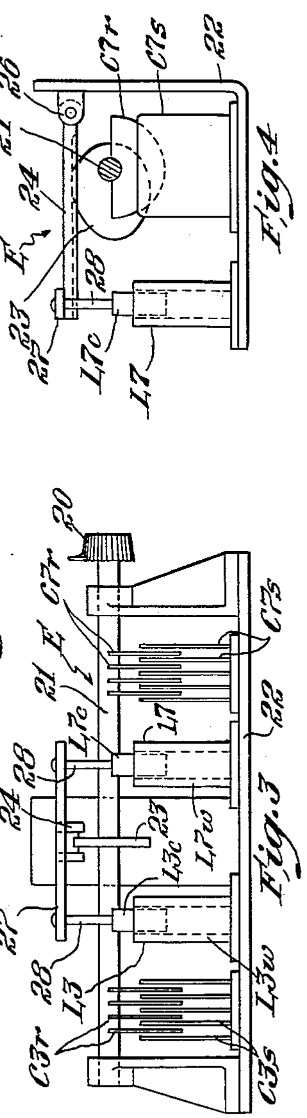
FIG. 3 is a side elevation of a novel tuning control.
FIG. 4 is an end elevation looking toward the left in FIG. 3, parts being omitted.

In order that the tuning elements associated with paths III to VI may be tuned to optimum sensitivity for the RF amplifier and detector their respective tuning elements, coil L3, condenser C3, coil L7 and condenser C7, are connected by a novel mechanical tuning device or tuneable component E shown in FIGS. 3 and 4 and indicated by the broken lines in FIG. 2. Rotors C3*r* and C7*r* of the respective condensers are mounted on a shaft 21 to one end of which there is fixed a tuning knob 20, and the stators C3*s* and C7*s* are fixed on a base 22 in a conventional manner. The windings L3*w* and L7*w* of coils L3 and L7 respectively are also mounted on the base 22. Attached to the shaft 21 is an eccentric or cam 23 adapted to raise and lower a lever 24 pivoted at 26. The lever 24 in turn raises and lowers a yoke 27 carrying plungers 28. Depending from the plungers 28 are tuning slugs or cores L3*c* and L7*c* of the respective tuning coils. when the shaft 21 adjusts the rotors C3*r* and C7*r* of the tuning condensers C3 and C7, the cores L3*c* and L7*c* are adjusted axially of the windings L3*w* and L7*w* so as to tune units L3—C3 and L7—C7 for optimum sensitivity to the signals carried in paths III to VI. The tuning knob 20 is adjusted for maximum signal indication while the ganged switches S1*a*—S1*e* are in any of the positions 3 to 6.

The output of the detector V2 is coupled to the control grid *c* of a conventional video amplifier V3. The picture signals of paths I to VI are carried through a frequency-compensating network L8 to terminals 1 to 6 of a fourth ganged switch S1*d*. The wiper of the fourth ganged switch S1*d* applies the signals to the control grid *c* of a twin triode V4.

One half of the twin triode V3 is connected as a leveler stage whose anode *a1* is connected to a germanium diode rectifier V11, which in turn is connected to a microvoltmeter M. The low resistance (12K.) of the plate resistor R10 for anode *a1* prevents overloading of the voltmeter M. On low gain signals the leveling threshold is not reached and this half of V4 acts as a triode amplifier as to paths VIII*a* and IX*a* described hereinafter. The other half of the twin triode V4 is connected as a cathode follower, the signal across the cathode resistor R12 associated with the cathode $k$ being applied to the vertical deflection terminals $v$ of the cathode ray oscilloscope O.

The picture RF and IF signals of paths I to VI are according to the foregoing description selectively amplified, detected and applied either to the oscilloscope O or meter M, or to both.

In some cases it may be desired to apply split sound or intercarrier sound signals to the oscilloscope or meter of the indicator. For this purpose paths VII and VII*a* are provided. Path VII for split sound beginning at contact 7 of switch S1*a* is capacitatively coupled through a shielded lead 33 to the control grid $c$ of the first intercarrier sound IF amplifier V5 to be described more fully hereinafter. The amplified signal appearing at the anode $a$ of amplifier V5 is capacitatively coupled through a capacitor C*y* and a shielded lead 37 to contact 7 of the fourth ganged switch S1*d* and thereafter is applied to the oscilloscope O or to the meter M, where the signals may be examined for proper phasing.

For paths VIII to XI, carrying picture, sweep and sound signals in the audio and video frequency ranges reference is made again to the first gauged switch S1*a*. Contacts 8 to 11 are connected through a shielded lead 34 to contacts 8 to 11 of ganged switch S1*d* directly to the indicator oscilloscope and meter. The signals passing through contact 8 of switches S1*a* and S1*d* are applied without attenuation and hence may be of higher amplitude than those carried through contact 9 of switch S1*a* and the attenuating resistor R3. Horizontal sweep oscillator and sawtooth signals of paths X and XI respectively are similarly applied to the indicator through contacts 10 and 11 of ganged switch S1*a*, the higher amplitude saw-tooth signals being attenuated by resistor R4.

In addition to the above described eleven paths I to XI, to the indicator, there are also provided eleven paths, I*a* to XI*a*, to the speaker P.

Paths I*a* and II*a* for antenna and radio frequency sound signals, and paths III*a* to V*a* for intermediate sound signals are amplified and detected in the same paths as paths I–V respectively and appear at the anode $a$ of the video amplifier V3. From this anode these paths proceed through lead 31, coupling capacitor C*z* and shielded conductors 32 and 33 to the control grid $c$ of the intercarrier sound IF amplifier V5. Amplifiers V5 and V6, the first and second stages of the intercarrier sound IF amplifier, are conventional 4.5 megacycle intermediate-frequency amplifiers. The amplified audio intermediate-frequency signal is inductively coupled to a conventional ratio detector or discriminator V7 requiring little limiting in previous stages. The discriminator V7 disclosed by way of example includes a pair of diodes which together with a subsequent audio frequency amplifier V8 are enclosed in a single envelope. The intermediate-frequency, frequency-modulated signal at the plate of amplifer V6 is fed to the primary tank coil L9 which is coupled to the secondary tank coil L11 of a conventional ratio detector. The audio frequency signal is detected at the center tap of the secondary tank coil L11 and is then applied through a choke and filter network F to contacts 1 to 5 of the fifth ganged switch S1*e* of paths I*a* to V*a* respectively. The signals of these contacts are connected through the wiper of switch S1*e* and a volume control R8 to a conventional audio amplifier V8 and a power amplifier V10 which drives the speaker P. This path permits sound to be heard in the speaker whenever sound is present in the composite video signal such as when testing R.F. amplifiers or antennas, on switch positions 1 through 5. On switch positions 3, 4, and 5 these paths also may be used to ascertain that the 4.5 mc. wave traps of television IF picture amplifiers are correctly adjusted.

For IF sound path VI*a*, reference is made back to anode $a$ of video amplifier V3. The signal appearing at this anode is carried by leads 31 and 36 to the contact 6 of the fifth ganged switch S1*e*.

The intercarrier IF sound signal of path VII*a* is capacitatively coupled from the input $t1$, through contact 7 of switch S1*a*, to the grid $c$ of the audio amplifier V5 and then along the same course as paths III*a*–V*a*.

The amplification of the intermediate-frequency sound signals in paths III*a* to VII*a* may be summarized as follows. Signals of low, medium and high amplitude are applied at contacts 3, 4 and 5 of the first ganged switch S1*a*. The medium and high amplitude signals are attenuated more or less and are then amplified in the RF amplifier and the IF amplifier channels, before being applied to the audio output channel and speaker. The sound IF signal of path VI*a* is amplified in the RF channel but is not amplified in the audio IF channel. Intercarrier IF sound signals of path VII*a* are amplified only in the audio IF amplifier, since the latter does not have as great gain as the RF amplifier channel. Paths III*a* to VII*a* are thus selected according to the normal amplitude of the signals examined.

Paths VIII*a* and IX*a* for sound signals at audio frequency and at relatively low and high amplitudes respectively are connected by the wiper of the first ganged switch S1*a* to contacts 8 and 9 respectively. Since the sound signal intended to be applied through path IX*a* is of higher amplitude than that intended to be applied through path VIII*a* an attenuating resistor R3 is connected with the contact 9. The audio frequency sound signal is applied through a shielded lead 34 to contacts 8 and 9 of the fourth ganged switch S1*d*. This signal then appears at the plate $a1$ of the leveler V4, and by way of capacitor C*x* and lead 39 reaches the contacts 8 and 9 of the fifth ganged switch S1*e*. When the wiper of switch S1*e* is in position 8 or 9 the sound signals are applied, through potentiometer R8, to the audio output amplifiers V8 and V10 and thence to the speaker P. Weak synchronization signals are amplified by the leveler half of tube V4, and are coupled from its plate $a1$ through lead 39 to contacts 8 and 9 of the fifth ganged switch S1*e*. These signals may be heard as characteristic buzz in the speaker P.

In paths X*a* and XI*a* high and low amplitude horizontal oscillator and sweep signals are applied by the first ganged switch S1*a* by its respective contacts 10 and 11. The horizontal sweep saw-tooth signal, being of higher amplitude than the oscillator signal, is attenuated by resistor R4. Paths X*a* and XI*a* then proceed through the shielded conductor 34 to contacts 10 and 11 of the fifth ganged switch S1*e*. At this point they are mixed with a signal produced by an audio oscillator stage V9. This stage is a twin triode connected as an RC oscillator producing a constant-frequency signal of 16,750 cycles per second. Regenerative feedback from anode $a2$ to control grid $c1$ is phased by an RC time-constant circuit comprising resistors R14 and R15, and R18 and capacitors C9 and C10. Plate current drawn by anode $a1$ produces a voltage drop across the common cathode resistor R11 which periodically drives cathode $k2$ positive with respect to grid $c2$. The 16,750 cycle signal appearing at the anode $a2$ is capacitatively coupled to contacts 10 and 11 of ganged switch S1*e*. This signal is applied only when the switch S2 is closed and supplies plate voltage to anode $a2$. When the oscillator On-Off switch S2 is closed and the wiper of ganged switch S1*e* is in either of the positions 10 and 11, the audio oscillator 16,750 cycle signal is mixed with the 15,750 cycle signal of the horizontal sweep oscillator or amplifier, producing a beat frequency of 1,000 cycles per second. The 1,000 cycle beat frequency is an easily distinguishable tone when applied through the audio output amplifiers V8 and V10 to the speaker. Thus, there is provided a convenient way of checking the horizontal sweep circuits. The frequency of the oscillator may be adjusted by varying capacitors C9 and C10.

Typical tube types and circuit component values are as follows:

*Tube types and component values*

| | | | Ohms |
|---|---|---|---|
| V1 | 6BC5 | R1 | 82 |
| V2 | 1N64 | R2 | 1,200 |
| V3 | 6BC5 | R3 | 82 |
| V4 | 12AT7 | R4 | 1,200 |
| V5 | 6AU6 | R5 | 5,600 |
| V6 | 6AU6 | R7 | 5,600 |
| V7 | ½6T8 | R8 | 500,000 |
| V8 | ½6T8 | R9 | 68,000 |
| V9 | 6AQ5 | R10 | 12,000 |
| V10 | 12AU7 | R11 | 470 |
| V11 | 1N64 | R12 | 8,200 |
| V12 | V12 | R13 | 68,000 |
| V13 | NE51 | R14 | 200,000 |
| | | R15 | 200,000 |

| | |
|---|---|
| L1 | 1 turn. |
| L2 | 1½ turns in primary, 5 turns in secondary. |
| L3 | 1½ turns in primary, 8 turns in secondary. |
| L4 | |
| L5 | 1½ turns. |
| L6 | 5½ turns. |
| L7 | 8 turns. |
| L8 | 250 and 350 microhenries. |
| C3 | 100 microfarads. |
| C7 | 100 microfarads. |
| C9 | 65 to 340 micromicrofarads. |
| C10 | 65 to 340 micromicrofarads. |

It should be understood that the above tube types and component values are given as examples only and that other types and values may be substituted by those skilled in the art. Similarly, equivalent amplifier and detector stages may be substituted for those shown. For example, the leveler stage of tube V4 may be eliminated if desired. A cascade amplifier such as a 6BK7 may be used instead of a 6BC5 for the RF amplifier V1. If desired, a single tunable coil may be substituted for the fixed coils L1 and L2 or L5 and L6.

I claim:

1. In an electronic waveform analyzer of the character described for indicating signal distortion in the various channels of a television receiver; a signal-input terminal, an output terminal for video signals, an output terminal for audio signals, means in the form of electrical parts some of which when connected with others of the same in various combinations being functional with such others to constitute frequency channels each beginning at said signal-input terminal and terminating at one of said output terminals and each responsive to a distinct frequency different from the respective and distinct frequencies to which the others of said channels are responsive; said channels including a radio-frequency channel comprising a radio-frequency amplifier and detector, an audio intermediate-frequency channel comprising an audio intermediate-frequency amplifier and audio detector, and an audio output channel; electrical connections respectively to said parts and in each case incomplete by themselves to complete any of said channels from said signal-input terminal common to all of the latter, and ganged multi-contact switches associated with said connections and functional jointly with the latter to effect completion of each of said channels selectively and individually, a first one of said switches following said signal-input terminal, a second one of said switches being connected between said first-named detector and said output terminal for video signals, a third one of said switches being connected between said audio detector and said audio output channel.

2. In an electronic waveform analyzer of the character described; a signal-input terminal, an output terminal for audio signals, means in the form of electrical parts some of which when connected with others of the same in various combinations being functional with such others to constitute circuit paths each beginning at said signal-input terminal and each responsive to a distinct frequency different from the respective and distinct frequencies to which the others of said paths are responsive, one of said paths being responsive to a sweep frequency, an oscillator associated with said sweep-frequency path and functional to generate a signal differing from said sweep frequency by an audibly-distinguishable frequency, said oscillator being connected so that its signal aforesaid beats against said sweep frequency and the resulting audibly-distinguishable frequency is applied to said output terminal, electrical connections respectively to said parts and in each case incomplete by themselves to complete any of said paths from said signal-input terminal common to all of the latter, switch means associated with said connections and functional jointly with the latter to effect completion of each of said paths selectively and individually, and means for effecting switching action of said switch means as and for the purpose aforesaid.

3. In an electronic waveform analyzer of the character described; a signal-input terminal, an output terminal for audio signals, means in the form of electrical parts some of which when connected with others of the same in various combinations being functional with such others to constitute circuit paths each beginning at said signal-input terminal and each responsive to a distinct frequency different from the respective and distinct frequencies to which the others of said paths are responsive, one of said paths comprising in order from said signal-input terminal to said audio output terminal a radio-frequency path and a video intermediate-frequency path and an audio intermediate-frequency path and an audio output path, electrical connections respectively to said parts and in each case incomplete by themselves to complete any of said paths from said signal-input terminal common to all of the latter, switch means associated with said connections and functional jointly with the latter to effect completion of each of said paths selectively and individually, one of said paths so completed being comprised of said radio-frequency and said video intermediate-frequency and said audio intermediate-frequency and said audio output paths thereby to provide at said audio output terminal signals either at radio frequency or at video intermediate frequency for aural testing of the same, and means for effecting switching action of said switch means as and for the purpose aforesaid.

4. In an electronic waveform analyzer of the character described; a signal-input terminal, means in the form of electrical parts some of which when connected with others of the same in various combinations being functional with such others to constitute circuit paths each beginning at said terminal and each responsive to a distinct frequency different from the respective and distinct frequencies to which the others of said paths are responsive, electrical connections respectively to said parts and in each case incomplete by themselves to complete any of said paths from said terminal common to all of the latter, switch means associated with said connections and functional jointly with the latter to effect completion of each of said paths selectively and individually, certain of said paths being responsive to radio frequencies and each including a tuning coil appropriate for the respective radio frequency, certain of said paths being responsive to intermediate frequencies and including at least one tuning network, and means for effecting switching action of said switch means as and for the purpose aforesaid.

5. In an electronic waveform analyzer of the character described; a signal-input terminal, means in the form of electrical parts some of which when connected with others of the same in various combinations being functional with such others to constitute circuit paths each beginning at said terminal and each responsive to a distinct frequency different from the respective and distinct frequencies to which the others of said paths are responsive, electrical connections respectively to said parts and in each case incomplete by themselves to complete any of said paths from said terminal common to all of the latter, switch means associated with said connections and functional jointly with the latter to effect completion of each of said paths selectively and individually, certain of said paths being responsive to radio frequencies and each including a tuning coil appropriate for the respective radio frequency, certain of said paths being responsive to intermediate frequencies and including at least one tuning network embodying a variable inductance and a variable capacitor, adjustable means common with respect to said inductance and to said capacitor for varying the same simultaneously and in unison thus to obtain a relatively high degree of effectiveness of the tuning function of said network, said adjustable means being operable independently of switching action of said switch means, and means for effecting switching action of said switch means as and for the purpose aforesaid.

6. In an electronic waveform analyzer of the character described; a signal-input terminal, an output terminal for video signals, means in the form of electrical parts some of which when connected with others of the same in various combinations being functional with such others to constitute circuit paths each beginning at said signal-input terminal and each responsive to a distinct frequency different from the respective and distinct frequencies to which the others of said paths are responsive, electrical connections respectively to said parts and in each case incomplete by themselves to complete any of said paths from said signal-input terminal common to all of the latter, switch means associated with said connections and functional jointly with the latter to effect completion of each of said paths selectively and individually, certain of such completed paths constituting a radio-frequency channel, certain of such completed paths including an intercarrier sound intermediate-frequency amplifier, one of such completed paths being responsive to intercarrier sound signals and being traceable from said signal-input terminal to and through said amplifier to a point in said analyzer beyond said radio-frequency channel and thence to said video-output terminal, and means for effecting switching action of said switch means as and for the purpose aforesaid.

References Cited in the file of this patent

UNITED STATES PATENTS

| | | |
|---|---|---|
| 2,217,925 | Triplett | Oct. 15, 1940 |
| 2,641,709 | Stover | June 9, 1953 |

OTHER REFERENCES

"Radio News," March 1946, "R.F. Probe Design" page 35.

"Encyclopedia on C.R. Oscilloscopes and their Uses," "R.F. Probes" page 353.

"Rider's Television Manual" volume 2, Motorola 2–27 Radio & Television Inc. 2–9, 10.

Rider's Television Manual, vol. 2, pp. Motorola 2–47

Rider's Television Manual, vol. 2, pp. Radio and Television Inc. 2–9, 10.